(12) United States Patent
Thiel

(10) Patent No.: US 8,219,299 B2
(45) Date of Patent: Jul. 10, 2012

(54) METHOD FOR SPEED REGULATION OF A MOTOR VEHICLE IN A COMPLEX TRAFFIC SITUATION

(75) Inventor: Robert Thiel, Niederstaufen (DE)

(73) Assignee: ADC Automotive Distance Control Systems GmbH, Lindau (DE)

( * ) Notice: Subject to any disclaimer, the term of this patent is extended or adjusted under 35 U.S.C. 154(b) by 583 days.

(21) Appl. No.: 12/226,853

(22) PCT Filed: Nov. 22, 2006

(86) PCT No.: PCT/DE2006/002055
§ 371 (c)(1),
(2), (4) Date: Oct. 29, 2008

(87) PCT Pub. No.: WO2007/124704
PCT Pub. Date: Nov. 8, 2007

(65) Prior Publication Data
US 2009/0164083 A1    Jun. 25, 2009

(30) Foreign Application Priority Data
May 3, 2006    (DE) .................. 10 2006 020 788

(51) Int. Cl.
*B60T 7/12* (2006.01)
*G06F 17/10* (2006.01)
*G06G 7/78* (2006.01)
*G08G 1/16* (2006.01)
*G08G 1/00* (2006.01)
*B60Q 1/00* (2006.01)

(52) U.S. Cl. .......... 701/96; 701/301; 340/435; 340/436; 340/901; 340/903

(58) Field of Classification Search .......... 701/220–226, 701/300–302, 96; 123/349–351; 180/170; 340/435–444
See application file for complete search history.

(56) References Cited

U.S. PATENT DOCUMENTS

| | | | |
|---|---|---|---|
| 6,282,483 B1 | 8/2001 | Yano et al. | |
| 6,370,475 B1 * | 4/2002 | Breed et al. | 701/301 |
| 7,177,748 B2 | 2/2007 | Irion et al. | |
| 7,373,237 B2 | 5/2008 | Wagner et al. | |
| 7,382,274 B1 * | 6/2008 | Kermani et al. | 340/901 |
| 7,386,385 B2 | 6/2008 | Heinrichs-Bartscher | |
| 2002/0049539 A1 * | 4/2002 | Russell et al. | 701/301 |
| 2003/0163239 A1 * | 8/2003 | Winner et al. | 701/93 |
| 2004/0022416 A1 * | 2/2004 | Lemelson et al. | 382/104 |
| 2004/0176900 A1 * | 9/2004 | Yajima | 701/96 |
| 2005/0010351 A1 * | 1/2005 | Wagner et al. | 701/96 |
| 2005/0043879 A1 * | 2/2005 | Desens et al. | 701/96 |
| 2005/0216171 A1 * | 9/2005 | Heinrichs-Bartscher | 701/96 |
| 2006/0047402 A1 * | 3/2006 | Irion et al. | 701/93 |
| 2007/0018801 A1 * | 1/2007 | Novotny et al. | 340/435 |
| 2007/0027597 A1 * | 2/2007 | Breuel et al. | 701/41 |

FOREIGN PATENT DOCUMENTS

| | | |
|---|---|---|
| DE | 103 11 192 | 9/2004 |
| EP | 1 455 323 | 9/2004 |
| EP | 1 504 948 | 2/2005 |
| WO | WO 03/031217 | 4/2003 |
| WO | WO 2004/045890 | 6/2004 |

* cited by examiner

*Primary Examiner* — James Trammell
*Assistant Examiner* — Majdi Alsomiri
(74) *Attorney, Agent, or Firm* — W. F. Fasse

(57) ABSTRACT

A method for regulating the velocity of a motor vehicle in a complex traffic situation is presented. The motor vehicle is equipped with a sensor system for recording the environment. In order to regulate the velocity, an at least partially covered object and/or at least one object on an adjacent lane is viewed.

25 Claims, No Drawings

METHOD FOR SPEED REGULATION OF A MOTOR VEHICLE IN A COMPLEX TRAFFIC SITUATION

FIELD OF THE INVENTION

The invention relates to a method for regulating the velocity of motor vehicles in a complex traffic situation. A method of this type can be used e.g. in motor vehicles which are equipped with ACC (Adaptive Cruise Control).

BACKGROUND OF THE INVENTION

In distance regulation systems which are common on the market for motor vehicles such as ACC, the object which is driving directly in front is selected for the regulation and warning functions of the ACC. With this regulation, complex traffic situations, in particular with multiple lane traffic guidance, are not adequately recorded, and a driver intervention is required despite the ACC, or the acceleration behaviour of the ACC motor vehicle is felt by the driver as being uncomfortable, since it does not give forewarning. In the following, several complex traffic situations and the behaviour of a regular distance regulation system shall be described:

A motor vehicle/objects swerve in just in front of the ACC motor vehicle from the neighbouring lane. Only when the swerving motion has been completed is the acceleration of the ACC motor vehicle adjusted to the object which is driving in front at a short distance. Since the force of a braking intervention is limited with the ACC, here, a driver intervention may be required in order to prevent crashing into the object.

The ACC motor vehicle changes the lane itself, in order to overtake a slower object driving in front. On the target lane, there is no object, but the ACC motor vehicle only accelerates to a specified velocity when the change in lane has been completed. This acceleration behaviour is frequently felt by the driver to be abrupt.

When the ACC motor vehicle changes lane, the motor vehicle on the target lane is only viewed for the regulation when the lane change has been completed. As a result, no object is regarded as being relevant in certain circumstances for a short period of time.

If an object which is covered by the object driving in front decelerates significantly, this is not taken into account for the acceleration regulation of the ACC motor vehicle, even when it can be predicted that the object driving directly in front will also brake. Here, it may be the case that a braking intervention by the ACC at the point in time when the vehicle driving in front also brakes is no longer sufficient.

When the motor vehicle driving in front changes lane, the covered object in front of the motor vehicle is only viewed when the lane change has been completed. The result of this is that an acceleration may possibly first be made with the swerving motor vehicle driving in front, and after the swerve of said motor vehicle, a deceleration is again undertaken, if now an acceleration regulation is applied to the previously covered motor vehicle.

SUMMARY OF THE INVENTION

The object of the invention is therefore to provide a method for regulating or controlling the speed or velocity of a motor vehicle, which method is also capable of securely and predictably regulating the longitudinal velocity of the motor vehicle in complex traffic situations.

This object is attained according to the invention by a method and a device as disclosed and claimed herein.

A method for regulating the velocity of a motor vehicle in a complex traffic situation is provided wherein the motor vehicle is equipped with a sensor system which is preferably aligned onto a motor vehicle environment in the direction of travel in front of the motor vehicle. This motor vehicle is referred to below as the subject motor vehicle or the own motor vehicle. For regulation purposes, not only an object driving directly in front of the subject motor vehicle—if present—is viewed, but also at least one further object is viewed in order to assess the traffic situation. At least partially covered or partially hidden objects and/or at least one object on an adjacent lane is detected by the sensor system, and taken into account for the velocity regulation. In this document, objects are defined as at least partially covered or partially hidden when they are not directly adjacent to the own motor vehicle, i.e. a further object is present between the covered object and the own vehicle, and covers the object at least partially. This applies e.g. to an object on the same lane which is driving in the same direction in front of an object driving directly in front, or an object on an adjacent lane which is covered by a further object on the own or adjacent lane. The extent to which at least partially covered objects are detected depends on the type of sensor. The detection behaviour, in relation to covered objects, of camera and infrared-based sensors approximately corresponds to that of the human eye. Objects are only sensed when they are not covered or only partially covered by other objects. Other sensors, in particular radar sensors, can also detect covered objects which are invisible to the human eye. Part of the emitted radar beam is reflected on the roadway and "crawls" below an object driving in front (motor vehicle) and is reflected from the object in front of the motor vehicle driving directly in front. The covered object which is invisible to the human eye can therefore be detected by a radar sensor.

In a preferred embodiment of the invention, the intention of changing lane of the own motor vehicle and/or an object is recorded. The intention to change lane can e.g. be determined on the basis of the transverse velocity of objects.

With the own motor vehicle, the blinker activity and/or a steering angle greater than a specified value can be used as an indication of the intention to change lanes. With a suitable sensor, e.g. a camera sensor, the blinker activity of an object can also be monitored and a driver's intention to change lanes can be concluded from it.

In an advantageous embodiment of the invention, the cross-track distance of the object or of the own motor vehicle is taken into account in order to determine the probability of an intended lane change. The cross-track distance is a measure of where an object or a motor vehicle is located on the lane. If an object or a motor vehicle moves very far to the right on the lane, while at the same time having a transverse velocity to the left, either a correction of the position on the current lane or a change of lane to the left-hand lane can be the intention. If the object or motor vehicle is on the other hand located very far to the left on the lane, while at the same time having a transverse velocity to the left, it is assumed to a high degree of probability that a change to the left-hand lane is intended. A further indicator for the probability of an intended lane change is the transverse velocity or transverse acceleration of the object or of the motor vehicle and blinker activity.

In a preferred embodiment of the invention, the intention of changing lane is given with more than two conditions (lane change or no lane change). For example, at least three discrete conditions (lane change or possible lane change or no lane change) are provided, or continuous information regarding probability of a future lane change is provided e.g. as a percentage. The intention to change lane is an indicator of when an object on an adjacent lane is relevant for the own motor vehicle.

In an advantageous embodiment of the invention, at least one object is assigned a nominal acceleration depending on at least the distance and relative velocity of the object in relation to the motor vehicle. In a particular embodiment, further parameters can contribute towards calculating the nominal acceleration. The nominal acceleration indicates how the current velocity of the own motor vehicle is altered within the framework of the marginal conditions (e.g. set highest velocity, limited force of the brake intervention or of an acceleration) when the motor vehicle follows precisely this object. A brake intervention corresponds to a negative nominal acceleration, and an acceleration of the motor vehicle corresponds to a positive nominal acceleration. If no correction of the motor vehicle velocity is necessary, the nominal acceleration equals zero.

In a preferred embodiment of the invention, objects are assigned a lower threshold value for a nominal acceleration. The threshold value depends on whether the object is covered and/or whether the object is on the own or an adjacent lane, and/or whether there is a detectable intention of the motor vehicle or of the object to change lanes.

In a particular embodiment of the invention, the reliability is also taken into account with which a recorded standing object is a relevant object, e.g. a motor vehicle, in order to determine the lower threshold value for the nominal acceleration. Non-relevant objects are e.g. objects for restricting the lane. This classification can e.g. be undertaken by a camera system with an object detection function. A radar system with local resolution can on the basis of the width and length information classify an object, e.g. a motor vehicle.

In an advantageous embodiment of the method, the object with the lowest or most negative nominal acceleration is assessed as being the object with the highest relevance, and the velocity regulation is applied to the object with the highest relevance.

DETAILED DESCRIPTION OF EXAMPLE EMBODIMENTS OF THE INVENTION

The invention will now be described in greater detail below on the basis of exemplary embodiments.

The lower threshold value for the nominal acceleration of an object is referred to in the following text as S_SB. The nominal acceleration which is assigned to an object is a measure for how the current velocity of the own motor vehicle is altered in the framework of the given marginal conditions when the vehicle follows precisely this object.

In a first exemplary embodiment, an object swerves very close in front of the own motor vehicle from the adjacent lane. The intention to change lanes and the potential to swerve is detected on the basis of the strength or magnitude of the transverse velocity of the object and/or the cross-track distance to the own lane. The threshold value S_SB of the swerving object is then reduced accordingly. If the nominal acceleration for the swerving object is now lower than the object driving directly in front due to the new S_SB, the swerving object becomes the object with the highest relevance. With a negative S_SB, a brake intervention is undertaken in order to follow the swerving object at a safe distance.

In a further exemplary embodiment, the own motor vehicle changes lanes with the intention of overtaking. The intention to change lanes is detected on the basis of the steering angle and the active blinker. The threshold value S_SB for the object which is to be overtaken is increased. No object is present on the target lane, i.e. the own motor vehicle would here be accelerated to the specified desired or highest velocity with a maximum permitted value. In this case, the increased threshold value S_SB for the object which is to be overtaken is usually the lowest nominal acceleration value, and the motor vehicle is accelerated or less strongly decelerated.

In a further exemplary embodiment, the own motor vehicle changes lanes with the intention of overtaking. The threshold value S_SB for the object which is to be overtaken is increased. An object is present on the target lane, and the threshold value S_SB of this object is reduced. If the object on the lane onto which the change is made has a higher velocity than the object driving in front, here also the regulation will continue to be carried out on the basis of the object in the old lane, but with the increased threshold value S_SB.

In a further exemplary embodiment, an object which is covered by the object driving in front is strongly decelerated e.g. by the end of a traffic jam. The nominal acceleration for this object is lowered, and comes closer to the threshold value S_SB. If the nominal acceleration of the covered object falls below the nominal acceleration of the object driving directly in front, which has not yet initiated a braking operation, then the nominal acceleration of the covered object is adopted as being the determining factor for the velocity regulation.

In a further exemplary embodiment, the object driving in front changes lane in order to overtake an object driving in front of it. Here, the nominal acceleration towards the motor vehicle intending to overtake becomes positive, since the own motor vehicle also wishes to accelerate. The nominal acceleration towards the motor vehicle driving in front of this object remains the same, however, and lies below that of the motor vehicle intending to overtake. The covered object becomes the object with highest relevance, and determines the velocity regulation of the motor vehicle.

The invention claimed is:

1. A method of controlling the speed of a subject vehicle in a complex traffic situation,
    wherein the subject vehicle is equipped with a sensor system for recording surroundings,
    wherein for said controlling, at least one object which is at least partially hidden and/or at least one object on an adjacent traffic lane is observed,
    wherein an intention to change lanes of the subject vehicle is detected,
    wherein a camera sensor is used to monitor an activity of the object, and an intention of the object to change lanes is inferred from the monitored activity,
    wherein a lower threshold value for a nominal acceleration of the speed of the subject vehicle is assigned to the object,
    wherein the threshold value depends on:
        whether the object is hidden, and
        whether the object is on the subject vehicle's own traffic lane or on the adjacent traffic lane, and
        whether there is a detectable intention of the subject vehicle or of the object to change lanes, and
    wherein the speed of the subject vehicle is controlled according to the lower threshold value of the nominal acceleration.

2. The method according to claim 1, characterized in that the lower threshold value for the nominal acceleration is determined taking into account a degree of certainty that a stationary object which has been detected is a relevant object.

3. The method according to claim 1, characterized in that there are more than two conditions which categorize a probability of the intention to change lanes.

4. The method according to claim 1, characterized in that there is a continuous scale indication of a probability of the intention to change lanes.

5. The method according to claim 1, characterized in that a turn signal blinker activity of the subject vehicle is used as an indication of the intention of the subject vehicle to change lanes.

6. The method according to claim 1, characterized in that the activity monitored by the camera sensor is a turn signal blinker activity of the object, and an intention of the object to change lanes is inferred from said turn signal blinker activity.

7. The method according to claim 1, characterized in that the nominal acceleration is assigned to the object, wherein the nominal acceleration is determined dependent on a distance of the object from, and a relative velocity of the object with respect to, the subject vehicle.

8. The method according to claim 7, characterized in that a plurality of the objects are observed, the object having the smallest or most negative nominal acceleration is judged to be the most relevant object, and said controlling of the speed of the subject vehicle is performed with reference to said most relevant object.

9. A motor vehicle including a driver assistance system for the adaptive control of the longitudinal velocity, wherein said system comprises means for performing a method according to claim 1.

10. A method of controlling a driving speed of a vehicle in a complex traffic situation, comprising:
   a) using a sensor system, recording a surrounding environment of the vehicle including objects on a subject traffic lane on which the vehicle is driving and/or on an adjacent traffic lane that is adjacent to the subject traffic lane;
   b) assigning respective nominal accelerations to respective ones of the objects;
   c) determining and assigning to a respective one of the objects a respective lower threshold value for the respective nominal acceleration assigned to the respective one of the objects, wherein the lower threshold value is dependent on at least one of:
      whether the respective object is hidden from a viewpoint of the vehicle,
      whether the respective object is on the subject traffic lane or on the adjacent traffic lane,
      whether there is a detected intention of the vehicle or of the object to change lanes;
   d) selecting a selected object as most relevant among the objects; and
   e) controlling the driving speed of the vehicle in response to and dependent on the respective nominal acceleration assigned to the selected object.

11. The method according to claim 10, wherein the lower threshold value is dependent on at least whether the respective object is hidden from the viewpoint of the vehicle.

12. The method according to claim 11, wherein the lower threshold value is further dependent on at least whether the respective object is on the subject traffic lane or on the adjacent traffic lane.

13. The method according to claim 11, wherein the lower threshold value is further dependent on at least whether there is the detected intention of the vehicle or of the respective object to change lanes.

14. The method according to claim 10, wherein the lower threshold value is dependent on at least whether there is the detected intention of the vehicle or of the respective object to change lanes.

15. The method according to claim 14, further comprising detecting whether there is the detected intention of the vehicle or of the respective object to change lanes by determining whether a turn signal blinker of the vehicle or of the respective object is activated, or by determining a transverse velocity of the vehicle or of the respective object, and using a result of the determining to conclude whether there is the detected intention of the vehicle or of the respective object to change lanes.

16. The method according to claim 10, wherein the nominal accelerations assigned to the respective objects are determined dependent on the respective relative distances and the respective relative speeds of the respective objects relative to the vehicle.

17. The method according to claim 10, wherein the selecting of the selected object as most relevant comprises selecting the respective object to which the smallest non-negative value or the most negative value of the nominal acceleration was assigned.

18. The method according to claim 10, wherein the surrounding environment of the vehicle is recorded to include the objects on the subject traffic lane and the objects on the adjacent traffic lane, also including hidden objects that are at least partially hidden from view behind other objects, and wherein the respective nominal accelerations are assigned to the respective objects including the hidden objects on the subject traffic lane and on the adjacent traffic lane.

19. A method of controlling a driving speed of a vehicle in a complex traffic situation, comprising:
   a) using a sensor system, recording a surrounding environment of the vehicle including objects on a subject traffic lane on which the vehicle is driving and/or on an adjacent traffic lane that is adjacent to the subject traffic lane;
   b) assigning respective nominal accelerations to respective ones of the objects;
   c) detecting whether there is a detected intention of the vehicle or of the respective objects to change lanes, wherein the detecting comprises detecting whether a turn signal blinker of the vehicle or of the respective object is activated or determining a transverse velocity of the vehicle or of the respective object, and dependent thereon concluding whether there is the detected intention of the vehicle or of the respective object to change lanes;
   d) adjusting values of the nominal accelerations in response to and dependent on whether there is a detected intention of the vehicle or of the respective objects to change lanes;
   e) selecting a selected object as most relevant among the objects based on the values of the nominal accelerations assigned to the objects; and
   f) controlling the driving speed of the vehicle in response to and dependent on the value of the respective nominal acceleration assigned to the selected object.

20. The method according to claim 19, wherein the detecting comprises detecting whether the turn signal blinker of the vehicle is activated, and dependent thereon concluding whether there is the detected intention of the vehicle to change lanes.

21. The method according to claim 19, wherein the detecting comprises determining the transverse velocity of the vehicle, and dependent thereon concluding whether there is the detected intention of the vehicle to change lanes.

22. The method according to claim 19, wherein the detecting comprises detecting whether the turn signal blinker of the respective object is activated by evaluating image data provided by the sensor system, and dependent thereon concluding whether there is the detected intention of the respective object to change lanes.

23. The method according to claim 19, wherein the detecting comprises categorizing the detected intention of the vehicle or of the respective object to change lanes among at least three probability categories including a first category indicating a lane change, a second category indicating a possible lane change, and a third category indicating no lane change.

24. The method according to claim 19, wherein the detecting comprises determining a probability on a continuous probability scale of the detected intention to change lanes.

25. The method according to claim 1, wherein the controlling of the speed of the subject vehicle comprises positively accelerating the subject vehicle and thereby increasing the speed when the lower threshold value of the nominal acceleration is a positive value, and comprises applying a brake and thereby decreasing the speed when the lower threshold value of the nominal acceleration is a negative value.

* * * * *